(12) United States Patent
Wilson et al.

(10) Patent No.: US 12,077,056 B2
(45) Date of Patent: Sep. 3, 2024

(54) BIDIRECTIONAL ELECTRIC VEHICLE CHARGING WITH MULTI-PHASE MACHINES

(71) Applicant: Cummins Inc., Columbus, IN (US)

(72) Inventors: Oliver D. Wilson, Fridley, MN (US); Akm Arafat, Blaine, MN (US)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 18/015,457

(22) PCT Filed: Jul. 1, 2021

(86) PCT No.: PCT/US2021/040114
§ 371 (c)(1),
(2) Date: Jan. 10, 2023

(87) PCT Pub. No.: WO2022/015519
PCT Pub. Date: Jan. 20, 2022

(65) Prior Publication Data
US 2023/0278441 A1    Sep. 7, 2023

Related U.S. Application Data

(60) Provisional application No. 63/051,422, filed on Jul. 14, 2020.

(51) Int. Cl.
*H02J 7/02* (2016.01)
*B60L 53/24* (2019.01)
(Continued)

(52) U.S. Cl.
CPC .............. *B60L 53/24* (2019.02); *B60L 55/00* (2019.02); *H02J 7/02* (2013.01); *H02M 7/537* (2013.01);
(Continued)

(58) Field of Classification Search
CPC ...... B60L 53/24; B60L 2220/58; B60L 55/00; B60L 2220/54; B60L 2210/40; H02J 7/02; H02J 2310/48; H02M 7/537
See application file for complete search history.

(56) References Cited

U.S. PATENT DOCUMENTS 10,230,254 B1 * 3/2019 Najmabadi ............. H02P 27/06
2015/0314694 A1 * 11/2015 Alakula .................. B60L 53/14
320/109

(Continued)

FOREIGN PATENT DOCUMENTS

DE    102011079214 A1 *  1/2013  ............. B60L 50/51
GB       2477128 A   *  7/2011  ............. B60L 1/006

(Continued)

OTHER PUBLICATIONS

International Search Report and Written Opinion for International patent application No. PCT/US2021/040114, filed Jul. 1, 2021, mailed Oct. 14, 2021.

(Continued)

*Primary Examiner* — Harry R Behm
(74) *Attorney, Agent, or Firm* — Faegre Drinker Biddle & Reath LLP

(57) ABSTRACT

A method and system for bidirectional charging in an electric vehicle include controlling a multi-phase machine in the electric vehicle. In response to determining that a direction of energy flow is from an electric grid to the electric vehicle, the method and system include operating a first set of phases in the multi-phase machine at a grid frequency of the electric grid and connecting the first set of phases in the multi-phase machine to the electric grid. In response to connecting the first set of phases in the multi-phase machine to the electric grid, the method and system include operating a second set of phases in the multi-phase machine, where the second set of phases in the multi-phase machine generates (Continued)

energy via electrical coupling to the first set of phases in the multi-phase machine. The method and system also include providing the energy generated by the second set of phases in the multi-phase machine to charge an energy source of the electric vehicle.

20 Claims, 6 Drawing Sheets

(51) Int. Cl.
  *B60L 55/00* (2019.01)
  *H02M 7/537* (2006.01)
(52) U.S. Cl.
  CPC ....... *B60L 2210/40* (2013.01); *B60L 2220/54* (2013.01); *B60L 2220/58* (2013.01); *H02J 2310/48* (2020.01)

(56) References Cited

U.S. PATENT DOCUMENTS

| | | | |
|---|---|---|---|
| 2017/0005564 A1 | 1/2017 | Somani et al. | |
| 2018/0170207 A1 | 6/2018 | Ko | |
| 2018/0278168 A1 | 9/2018 | Brown et al. | |
| 2019/0047433 A1 | 2/2019 | Rozman et al. | |
| 2019/0126760 A1* | 5/2019 | Najmabadi | B60L 53/20 |
| 2019/0126763 A1* | 5/2019 | Najmabadi | B60L 53/24 |
| 2019/0184837 A1* | 6/2019 | Najmabadi | H02P 27/06 |
| 2020/0122585 A1 | 4/2020 | Bhat et al. | |

FOREIGN PATENT DOCUMENTS

| | | | |
|---|---|---|---|
| GB | 2537351 A * | 10/2016 | B60L 11/1814 |
| WO | 2019071360 A1 | 4/2019 | |

OTHER PUBLICATIONS

International Preliminary Report on Patentability received for PCT Patent Application No. PCT/US2021/040114, mailed on Jul. 28, 2022, 28 pages.
International Search Report and Written Opinion received for PCT Patent Application No. PCT/US2021/040114, mailed on Oct. 14, 2021, 8 pages.
Abdel-Khalik et al., "Performance Evaluation of an On-Board Integrated Battery Charger System Using a 12-Slot/10-Pole Surface-Mounted PM Propulsion Motor", IEEE, May 11, 2017, pp. 1-6.
European Search Report for EP Patent Application No. 21841631.1, Issued on Jun. 18, 2024, 13 pages.
Metwly et al., "A Review of Integrated On-Board EV Battery Chargers: Advanced Topologies, Recent Developments and Optimal Selection of FSCW Slot/Pole Combination", IEEE, vol. 8, No. 1, May 6, 2020, pp. 85216-85242.

* cited by examiner

BIDIRECTIONAL ELECTRIC VEHICLE CHARGING WITH MULTI-PHASE MACHINES

CROSS-REFERENCE TO RELATED APPLICATIONS

The present application claims the benefit of International Patent Application No. PCT/US2021/040,114, filed Jul. 1, 2021, which claims priority to U.S. Provisional Patent Application No. 63/051,422, filed Jul. 14, 2020, the entire disclosures of which are hereby incorporated by reference in their entirety.

FIELD OF THE DISCLOSURE

The present disclosure generally relates to multi-phase electric machines, and more particularly to techniques for bidirectional charging of electric vehicles using multi-phase electric machines.

BACKGROUND OF THE DISCLOSURE

Multi-phase electric machines are utilized in various applications including electric vehicles. For example, a drive system of an electric vehicle typically includes an alternating current (AC) electric motor driven by a direct current (DC) power source (e.g., a main battery). The AC electric motor is coupled to the DC power source via an inverter which performs switching functions to convert the DC power to AC power. The DC power source is a rechargeable energy storage device that needs to be replenished periodically. Typically, the DC power source is charged by connecting to a power grid using additional hardware (e.g., rectifiers, converters, protection circuits, etc.), which often results in increased cost and weight to the electric vehicle. Accordingly, there remains a need to develop other techniques for charging electric vehicles such as by utilizing multi-phase electric machines.

SUMMARY

According to some embodiments, the present disclosure provides a system for bidirectional charging in an electric vehicle. The system includes a multi-phase machine, and a controller coupled to the multi-phase machine. The controller is configured to receive a first request for energy flow from an electric grid to the electric vehicle. The controller is also configured to operate a first set of phases in the multi-phase machine through a first inverter. In response to the first set of phases in the multi-phase machine being operated at a grid frequency of the electric grid, the controller is configured to switch the first set of phases in the multi-phase machine to the electric grid. In response to switching the first set of phases in the multi-phase machine to the electric grid, the controller is configured to operate a second set of phases in the multi-phase machine through a second inverter, where the second set of phases in the multi-phase machine generates energy via electrical coupling to the first set of phases in the multi-phase machine. The controller is also configured to provide the energy generated by the second set of phases in the multi-phase machine to charge an energy source of the electric vehicle.

According to certain embodiments, the present disclosure provides a controller for bidirectional charging in an electric vehicle. The controller includes a processor and a memory. The memory includes instructions that, when executed by the processor, cause the controller to receive a first request for energy flow from an electric grid to the electric vehicle. The electric vehicle includes a multi-phase machine. The processor also causes the controller to operate a first set of phases in the multi-phase machine through a first inverter. In response to the first set of phases in the multi-phase machine being operated at a grid frequency of the electric grid, the processor causes the controller to switch the first set of phases in the multi-phase machine to the electric grid. In response to switching the first set of phases in the multi-phase machine to the electric grid, the processor causes the controller to operate a second set of phases in the multi-phase machine through a second inverter, where the second set of phases in the multi-phase machine generates energy via electrical coupling to the first set of phases in the multi-phase machine. The processor also causes the controller to provide the energy generated by the second set of phases in the multi-phase machine to charge an energy source of the electric vehicle.

According to some embodiments, the present disclosure provides a method for bidirectional charging in an electric vehicle. The method includes determining a direction of energy flow between the electric vehicle and an electric grid. The electric vehicle includes a multi-phase machine. In response to determining that the direction of energy flow is from the electric grid to the electric vehicle, the method includes operating a first set of phases in the multi-phase machine through a first inverter. In response to the first set of phases in the multi-phase machine being operated at a grid frequency of the electric grid, the method includes switching the first set of phases in the multi-phase machine to the electric grid. In response to switching the first set of phases in the multi-phase machine to the electric grid, the method includes operating a second set of phases in the multi-phase machine through a second inverter, where the second set of phases in the multi-phase machine generates energy via electrical coupling to the first set of phases in the multi-phase machine. The method also includes providing the energy generated by the second set of phases in the multi-phase machine to charge an energy source of the electric vehicle.

In some embodiments, in response to determining that the direction of energy flow is from the electric vehicle to the electric grid, the controller operates the second set of phases in the multi-phase machine through the second inverter. In certain embodiments, in response to the second set of phases in the multi-phase machine being operated at the grid frequency of the electric grid, the controller switches the first set of phases in the multi-phase machine to the electric grid, where the first set of phases in the multi-phase machine generates energy via electrical coupling to the second set of phases in the multi-phase machine and the energy generated by the first set of phases in the multi-phase machine is provided to the electric grid.

In certain embodiments, operating the first set of phases in the multi-phase machine through the first inverter includes closing a first set of switches to connect the first set of phases in the multi-phase machine to the first inverter. In some embodiments, in response to the first set of phases in the multi-phase machine being operated at the grid frequency of the electric grid, the first set of phases in the multi-phase machine is isolated from the first inverter by opening the first set of switches to disconnect the first set of phases in the multi-phase machine from the first inverter. In certain embodiments, connecting the first set of phases in the multi-phase machine to the electric grid includes closing a second set of switches to connect the first set of phases in the multi-phase machine to the electric grid. In some examples, the multi-phase machine is a six-phase machine with each of the first set of phases and the second set of phases being a three-phase system.

DETAILED DESCRIPTION

Figure 1:
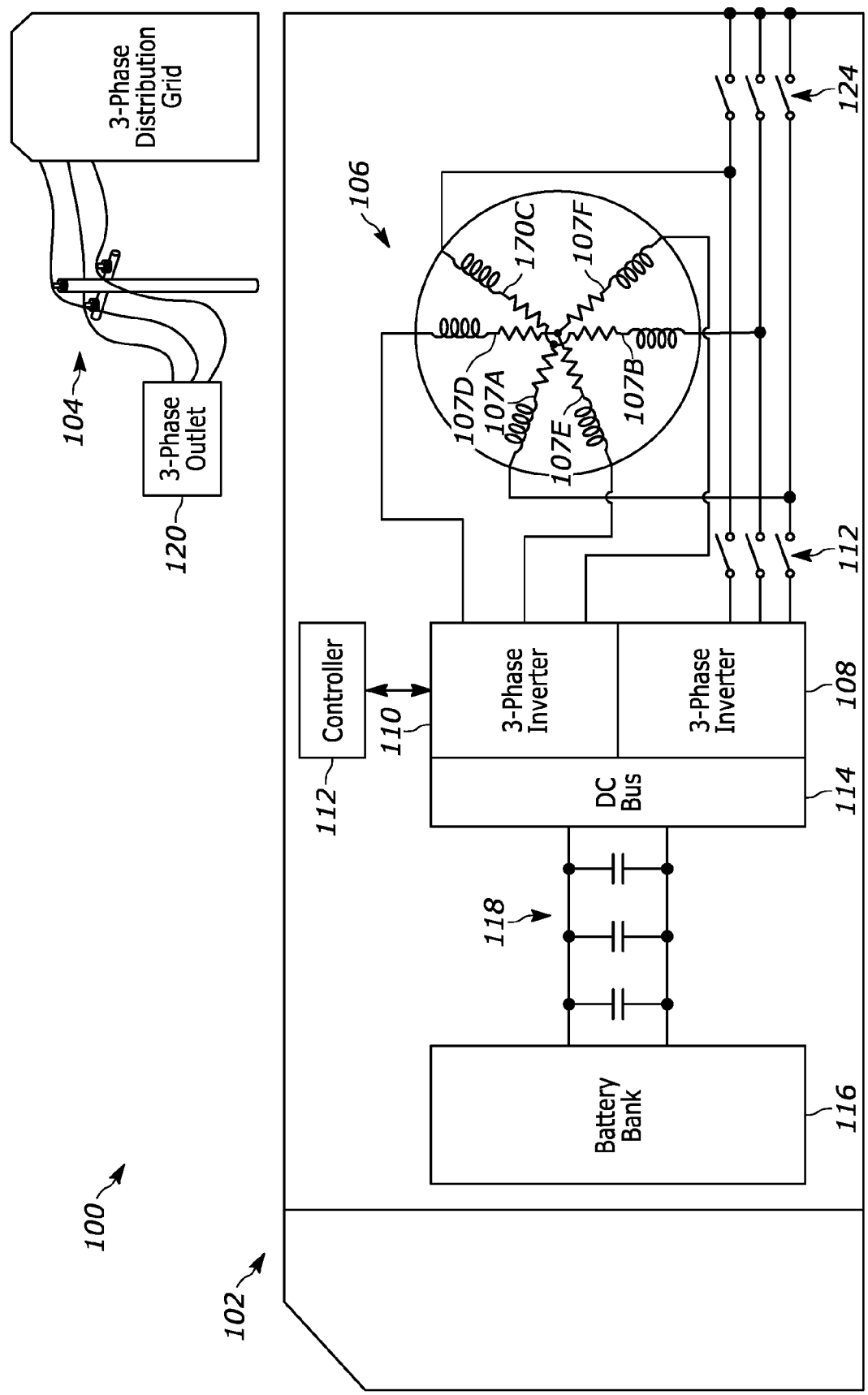
FIG. 1 is a block diagram illustrating a system for bidirectional charging of an electric vehicle.

For the purposes of promoting an understanding of the principles of the present disclosure, reference is now made to the embodiments illustrated in the drawings, which are described below. The embodiments disclosed herein are not intended to be exhaustive or to limit the disclosure to the precise form disclosed in the following detailed description. Rather, these embodiments were chosen and described so that others skilled in the art may utilize their teachings.

The terms "couples," "coupled," and variations thereof are used to include both arrangements wherein two or more components are in direct physical contact and arrangements wherein the two or more components are not in direct contact with each other (e.g., the components are "coupled" via at least a third component), but yet still cooperate or interact with each other.

Throughout the present disclosure and in the claims, numeric terminology, such as first and second, is used in reference to various components or features. Such use is not intended to denote an ordering of the components or features. Rather, numeric terminology is used to assist the reader in identifying the component or features being referenced and should not be narrowly interpreted as providing a specific order of components or features.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

An electric vehicle needs external power to recharge its energy storage system (e.g., vehicle-to-grid (V2G) charging). According to various embodiments, a six-phase motor system is provided to accomplish this by synchronizing a six-phase motor to a three-phase power grid. The six-phase motor is configured in two three-phase stages. One of the three-phase stages is isolated from the system and connected to the power grid. The other of the three-phase stages is placed into a regeneration mode to draw power from the motor. This interfacing scheme eliminates the need for additional hardware to interface with the power grid when charging the electric vehicle. The six-phase motor system operates over a range of grid frequencies and voltages, which adds versatility to the electric vehicle.

Additionally, the six-phase motor system provides isolation between the electric vehicle's DC system and the AC power grid, which reduces electrical emissions and enhances safety. The six-phase motor system is bidirectional allowing the electric vehicle to temporarily connect to and supply energy to the power grid. In some embodiments, at the end of the electric vehicle's life, the electric vehicle can be converted for stationary energy storage and power conditioning applications with minimal modifications. The six-phase motor system provides advantages by eliminating additional hardware to thereby provide cost savings and weight reductions in the electric vehicle, while enhancing the electric vehicle's performance and safety.

Referring now to FIG. 1, a block diagram of a system 100 for bidirectional charging is shown including an electric vehicle 102 and an electric grid 104 (e.g., a 3-phase distribution grid, a microgrid, etc.). Electric vehicle 102 includes, among other things, a multi-phase AC machine 106, inverters 108, 110, a controller 112, a DC bus 114, and a battery bank 116. For ease of illustration, other components of electric vehicle 102 (e.g., transmission, brakes, wheels, etc.) are not shown, the operations of which are known to those skilled in the art. As used herein, the term "electric vehicle" refers to any vehicle that is partly or entirely operated based on stored electric power such as a pure electric vehicle, a hybrid electric vehicle, or the like. Such vehicles can include road vehicles (e.g., cars, trucks, buses, etc.), rail vehicles, underwater vessels, aircrafts, and other suitable vehicles.

According to various embodiments, multi-phase AC machine 106 is a motor used to provide torque in electric vehicle 102. For example, motor 106 is a six-phase asymmetric permanent magnet synchronous AC motor. As used herein, the term "AC machine" refers to an AC powered device that converts electrical energy to mechanical energy or vice versa.

As shown in FIG. 1, motor 106 has six windings 107A-107F, with each being associated with a respective phase of motor 106. Motor 106 is set up like two three-phase systems electrically coupled to each other. For example, a first set of phases include windings 107A-107C, while a second set of phases include windings 107D-107F. The two sets of phases or windings are shifted from one another by a phase value (e.g., 30 degrees, 60 degrees, etc.). As an example, if the phase value is 30 degrees, then the first and second sets of phases are asymmetric in nature. In certain embodiments, two individual three-phase motors may be used as motor 106.

Windings 107A-107F represent a stator of motor 106. For ease of illustration, the stator and other components (e.g., rotor, shaft, etc.) of motor 106 are not shown. Generally, the rotor is mounted to the shaft and the rotor is separated from the stator by an air gap. When utilized as a motor, the stator causes the rotor to rotate utilizing electrical energy thereby rotating the shaft to provide mechanical energy. On the other hand, when utilized as a generator, the shaft is rotated by an external mechanical force that causes the rotor to rotate thereby causing the stator to generate electrical energy.

Controller 112 operates motor 106 via respective inverters 108, 110. For example, controller 112 receives operating signals from motor 106 and generates control signals to control the switching operations of inverters 108, 110 respectively to thereby control the outputs (e.g., currents) provided to windings 107A-107F.

Inverters 108, 110 include, among other things, switching devices (e.g., transistors, diodes, etc.) to appropriately switch DC voltages and provide energization to windings 107A-107F as known to those skilled in the art. As an example, inverters 108, 110 may be pulse width modulated inverters. While FIG. 1 shows inverters 108, 110 as being separate three-phase inverters that each control a respective winding group, in some embodiments, windings 107A-107F may be controlled by using a single six-phase inverter. In certain embodiments, controller 112 may be part of inverter 108 and/or inverter 110.

Inverters 108, 110 are connected to battery bank 116 (e.g., lithium-ion battery packs) via DC bus 114, which includes one or more DC bus capacitors 118. Battery bank 116 acts as an energy source of electric vehicle 102 which needs to be replenished periodically. To do so, electric vehicle 102 is plugged into an outlet 120 of electric grid 104 to allow energy (e.g., electricity) to flow between electric vehicle 102 and electric grid 104. By using a first set of switches 122 and a second set of switches 124, energy can flow from electric grid 104 to electric vehicle 102 via motor 106, and from electric vehicle 102 to electric grid 104 via motor 106.

According to some embodiments, controller 112 includes a non-transitory memory having instructions that, in response to execution by a processor, cause the processor to perform the functions of controller 112 as described herein. The processor, non-transitory memory and controller 112 are not particularly limited and can, for example, be physically separate.

In certain embodiments, controller 112 forms a portion of a processing subsystem including one or more computing devices having memory, processing, and communication hardware. For example, controller 112 can be a single device or a distributed device, and functions of controller 112 can be performed by hardware and/or as computer instructions on a non-transient computer readable storage medium, such as the non-transitory memory.

In some embodiments, controller 112 includes one or more interpreters, determiners, evaluators, regulators, and/or processors that functionally execute the operations of controller 112. Interpreters, determiners, evaluators, regulators, and processors can be implemented in hardware and/or as computer instructions on a non-transient computer readable storage medium and can be distributed across various hardware or computer-based components.

Figure 2:
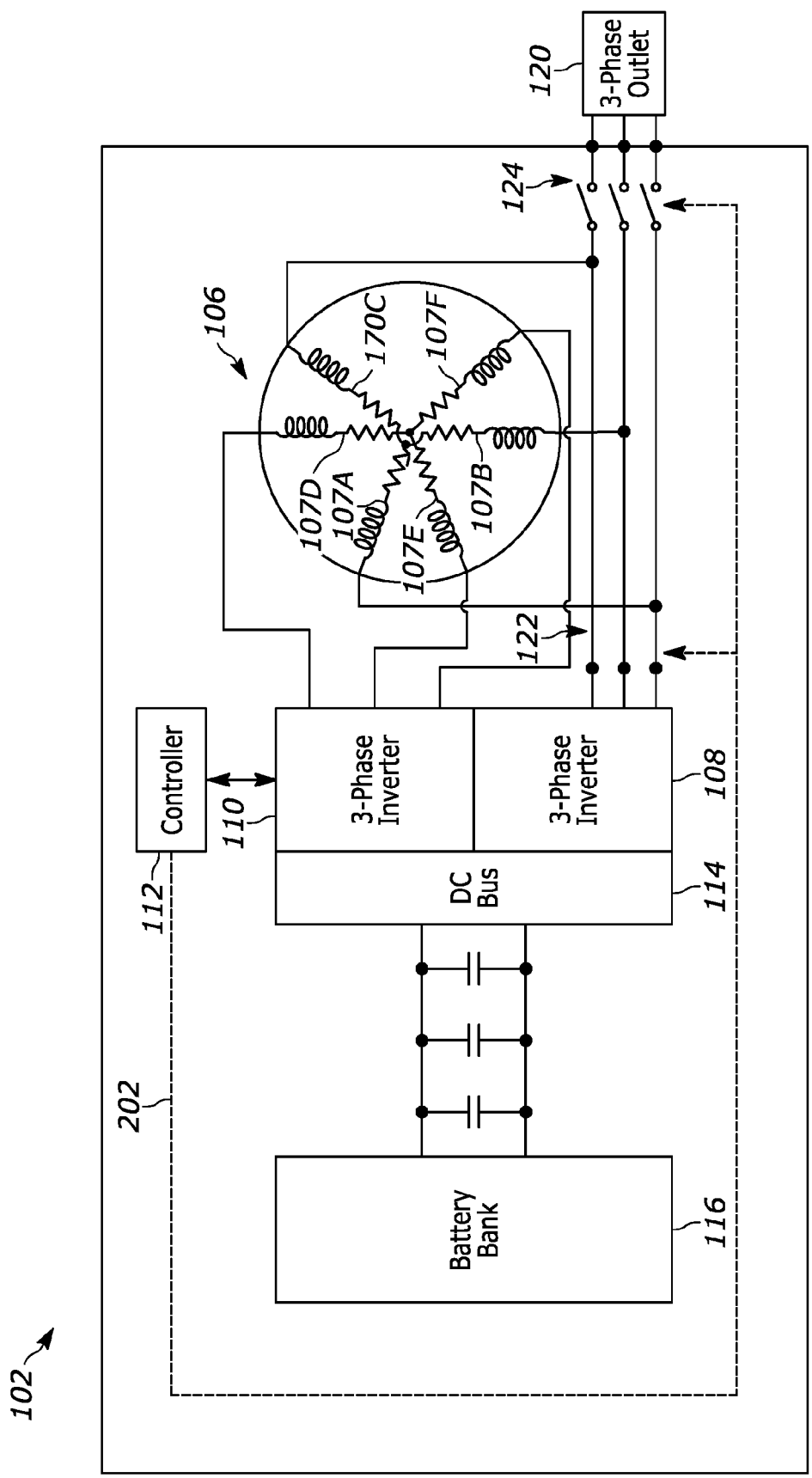
FIGS. 2 and 3 are block diagrams illustrating operations to provide energy from an electric grid to the electric vehicle of FIG. 1.
Figure 3:
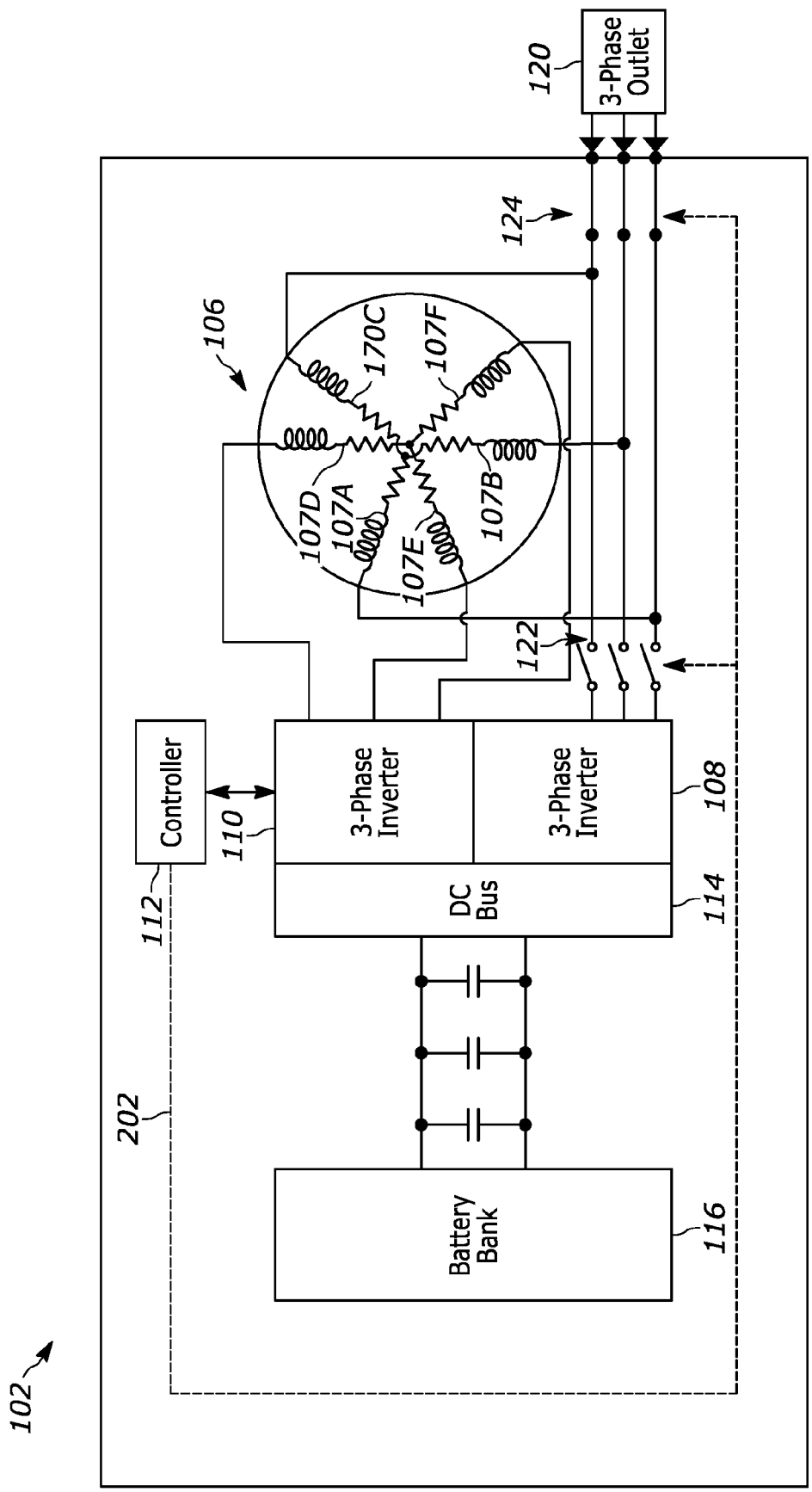

FIGS. 2 and 3 are block diagrams illustrating the transfer of energy from electric grid 104 to electric vehicle 102. This represents charging/recharging schemes for electric vehicle 102. To do so, controller 112 determines that the direction of energy flow is from electric grid 104 to electric vehicle 102. For example, controller 112 may receive an input from a user (e.g., an operator of electric vehicle 102) indicating that battery bank 116 needs to be charged. As an example, a monitoring device in electric vehicle 102 (e.g., a battery management system (BMS)) may signal to controller 112 that battery bank 116 has been depleted and thus needs recharging.

To begin transferring energy from electric grid 104 to electric vehicle 102, controller 112 initiates operation of the first set of phases (e.g., 107A-107C) in motor 106 through inverter 108. As shown in FIG. 2, controller 112 sends a control signal 202 to close first set of switches 122 but open second set of switches 124. This connects the first set of phases (e.g., 107A-107C) in motor 106 to inverter 108. Controller 112 operates the first set of phases (e.g., 107A-107C) in motor 106 up to a grid frequency (e.g., 60 Hz) of electric grid 104. In some embodiments, controller 112 operates the first set of phases (e.g., 107A-107C) in motor 106 according to other properties of electric grid 104 (e.g., voltage, phase angle, etc.).

When the first set of phases (e.g., 107A-107C) in motor 106 is operating at the grid frequency, controller 112 enables a connection between the first set of phases (e.g., 107A-107C) in motor 106 and electric grid 104 via outlet 120. As shown in FIG. 3, controller 112 sends control signal 202 to disconnect the first set of phases (e.g., 107A-107C) in motor 106 from inverter 108 by opening first set of switches 122. At the same time, controller 112 uses control signal 202 to connect the first set of phases (e.g., 107A-107C) in motor 106 to outlet 120 by closing second set of switches 124.

Once connected, electric grid 104 provides energy to the first set of phases (e.g., 107A-107C) in motor 106, which in turn causes energy to be generated in the second set of phases (e.g., 107D-107F) in motor 106 via electrical coupling to the first set of phases (e.g., 107A-107C) in motor 106. In particular, controller 112 operates the second set of phases (e.g., 107D-107F) in motor 106 through inverter 110 in a regeneration mode to draw power or energy from the first set of phases (e.g., 107A-107C) in motor 106. Controller 112 then provides the energy generated by the second set of phases (e.g., 107D-107F) in motor 106 to battery bank 116 via DC bus 114 to recharge battery bank 116.

Figure 4:
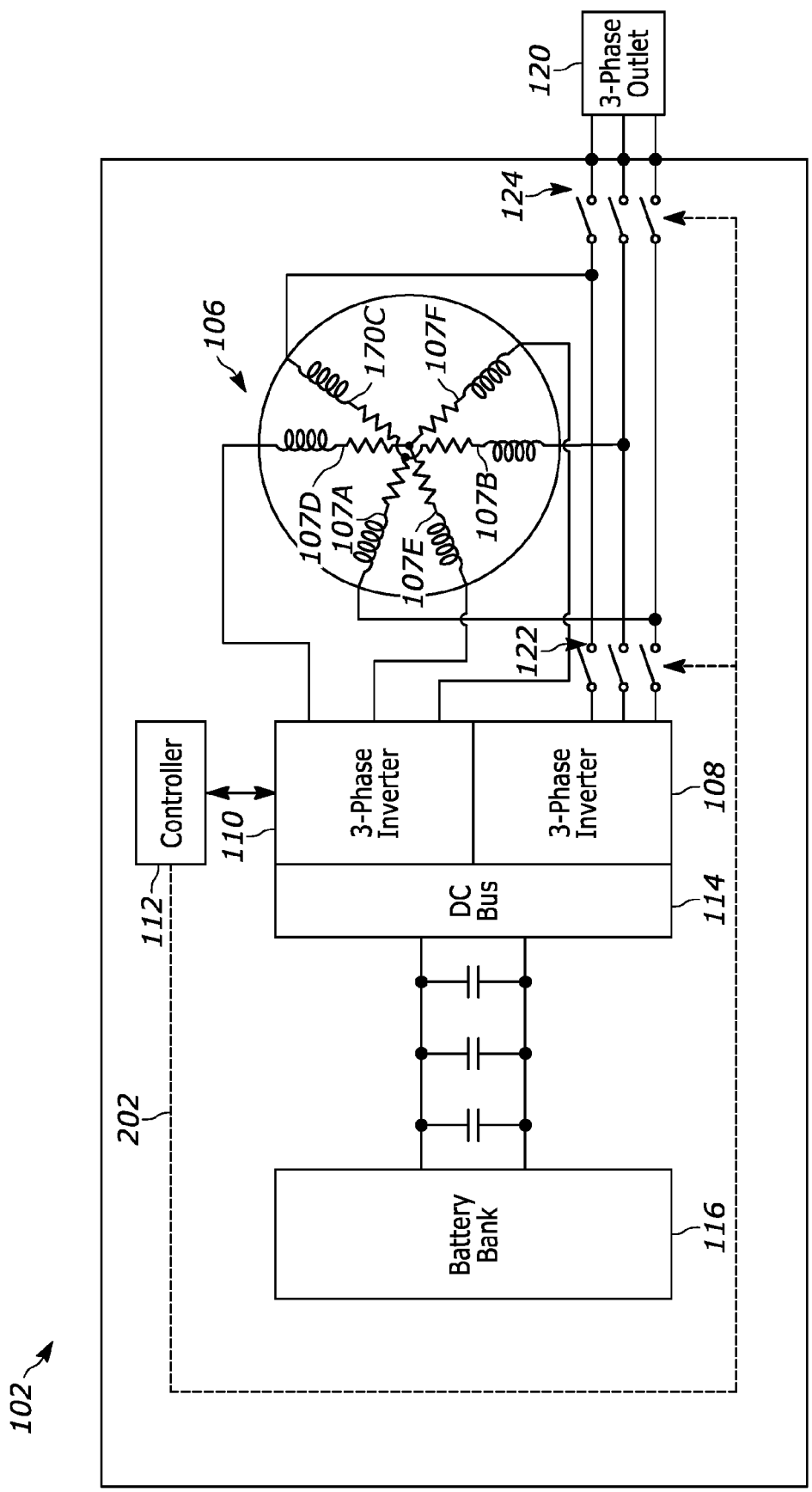
FIGS. 4 and 5 are block diagrams illustrating operations to provide energy from the electric vehicle of FIG. 1 to an electric grid.
Figure 5:
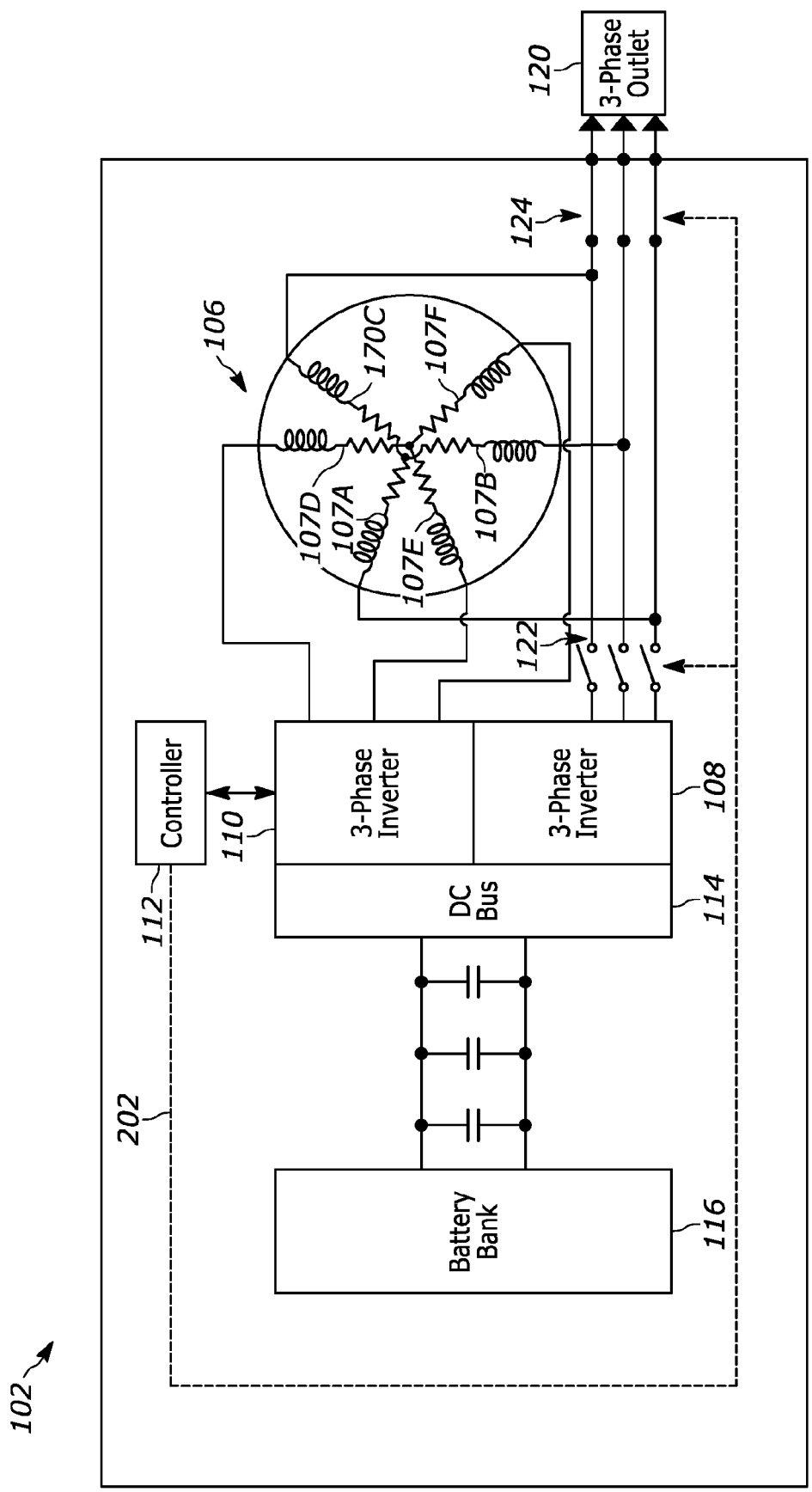

FIGS. 4 and 5 are block diagrams illustrating the transfer of energy from electric vehicle 102 to electric grid 104. This represents grid assist and/or grid forming schemes for electric grid 104. To do so, controller 112 determines that the direction of energy flow is from electric vehicle 102 to electric grid 104. For example, controller 112 may receive an input from a user or operator of electric vehicle 102 indicating that electric vehicle 102 has capacity to share or contribute energy to electric grid 104.

To begin transferring energy from electric vehicle 102 to electric grid 104, controller 112 initiates operation of the second set of phases (e.g., 107D-107F) in motor 106 through inverter 110. As shown in FIG. 4, controller 112 sends control signal 202 to open first and second sets of switches 122, 124, while operating the second set of phases (e.g., 107D-107F) in motor 106 up to the grid frequency of electric grid 104. In some embodiments, controller 112 operates the second set of phases (e.g., 107D-107F) in motor 106 in accordance with other properties of electric grid 104.

When the second set of phases (e.g., 107D-107F) in motor 106 is operating at the grid frequency, controller 112 enables a connection between the first set of phases (e.g., 107A-107C) in motor 106 and electric grid 104 via outlet 120. As shown in FIG. 5, controller 112 sends control signal 202 to connect the first set of phases (e.g., 107A-107C) in motor 106 to outlet 120 by closing second set of switches 124. The first set of phases (e.g., 107A-107C) in motor 106 generates energy via electrical coupling to the second set of phases (e.g., 107D-107F) in motor 106. In particular, the first set of phases (e.g., 107A-107C) in motor 106 draws power or energy from the second set of phases (e.g., 107D-107F) in motor 106 in a regeneration mode. In this manner, the energy generated by the first set of phases (e.g., 107A-107C) in motor 106 is provided or supplied to electric grid 104.

Figure 6:
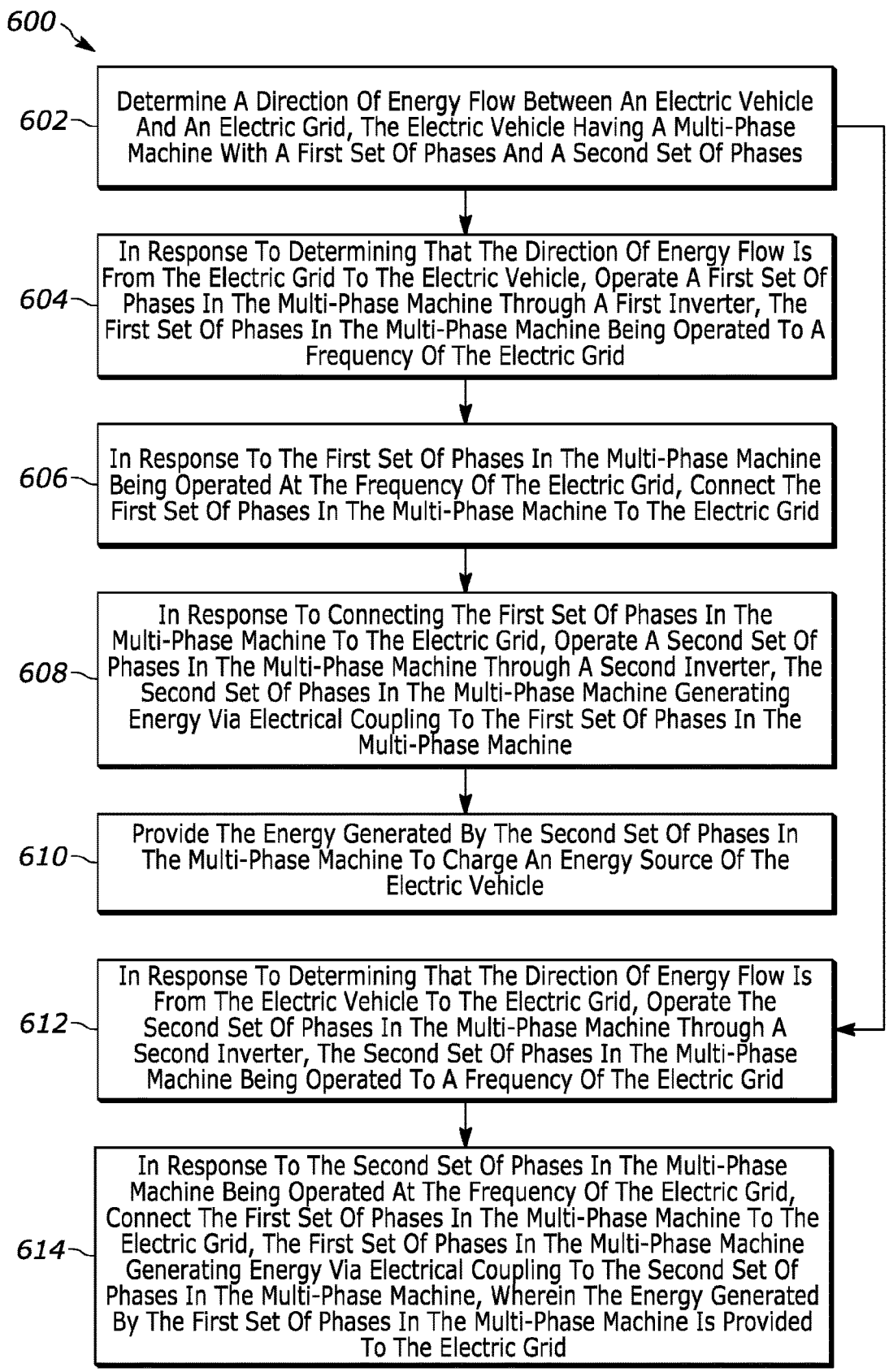
FIG. 6 is a flow chart illustrating a method for operating the electric vehicle of FIG. 1 for bidirectional charging.

Referring now to FIG. 6, a method 600 for operating an electric vehicle (e.g., 102) for bidirectional charging is shown. For example, method 600 is performed by a controller (e.g., 112). At block 602, the controller determines a direction of energy flow between the electric vehicle and an electric grid. The electric vehicle includes a multi-phase machine (e.g., 106). In some examples, the multi-phase machine is a six-phase machine with a first set of phases (e.g., 107A-107C) and a second set of phases (e.g., 107D-107F) each being a three-phase system.

At block 604, in response to the controller determining that the direction of energy flow is from the electric grid to the electric vehicle (e.g., the controller receives a first request for energy flow from the electric grid to the electric vehicle), the controller operates the first set of phases in the multi-phase machine through a first inverter (e.g., 108), where the first set of phases in the multi-phase machine is operated at a grid frequency of the electric grid. In some embodiments, operating the first set of phases in the multi-phase machine through the first inverter includes closing a first set of switches (e.g., 122) to connect the first set of phases in the multi-phase machine to the first inverter.

At block 606, in response to the first set of phases in the multi-phase machine being operated at the grid frequency of the electric grid, the controller switches the first set of phases in the multi-phase machine to the electric grid. In some embodiments, when the first set of phases in the multi-phase machine is operated at the grid frequency of the electric grid, the controller isolates the first set of phases in the multi-phase machine from the first inverter by opening the first set of switches to disconnect the first set of phases in the multi-phase machine from the first inverter. In certain embodiments, connecting the first set of phases in the multi-phase machine to the electric grid includes closing a second set of switches (e.g., 124) to connect the first set of phases in the multi-phase machine to the electric grid.

At block 608, in response to switching the first set of phases in the multi-phase machine to the electric grid, the controller operates the second set of phases in the multi-phase machine through a second inverter (e.g., 110), where the second set of phases in the multi-phase machine generates energy via electrical coupling to the first set of phases in the multi-phase machine. At block 610, the controller provides the energy generated by the second set of phases in the multi-phase machine to charge an energy source (e.g., 116) of the electric vehicle.

Turning to block 612, in response to the controller determining that the direction of energy flow is from the electric vehicle to the electric grid (e.g., the controller receives a second request for energy flow from the electric vehicle to the electric grid), the controller operates the second set of phases in the multi-phase machine through a second inverter (e.g., 110), where the second set of phases in the multi-phase machine is operated at the grid frequency of the electric grid.

At block 614, in response to the second set of phases in the multi-phase machine being operated at the grid frequency of the electric grid, the controller switches the first set of phases in the multi-phase machine to the electric grid, where the first set of phases in the multi-phase machine generates energy via electrical coupling to the second set of phases in the multi-phase machine and the energy generated by the first set of phases in the multi-phase machine is then provided to the electric grid. In some embodiments, switching the first set of phases in the multi-phase machine to the electric grid includes opening a first set of switches (e.g., 122) to disconnect the first set of phases in the multi-phase machine from a first inverter (e.g., 108) and closing a second set of switches (e.g., 124) to connect the first set of phases in the multi-phase machine to the electric grid.

This application is intended to cover any variations, uses, or adaptations of the present disclosure using its general principles. Further, this application is intended to cover such departures from the present disclosure as come within known or customary practice in the art to which the present disclosure pertains and which fall within the limits of the appended claims.

Furthermore, the connecting lines shown in the various figures contained herein are intended to represent functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic with the benefit of this disclosure in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system, comprising:
    a multi-phase machine; and
    a controller coupled to the multi-phase machine, the controller configured to:
       receive a first request for energy flow from an electric grid to an electric vehicle;
       operate a first set of phases in the multi-phase machine through a first inverter, the first set of phases in the multi-phase machine being operated at a grid frequency of the electric grid;
       in response to the first set of phases in the multi-phase machine being operated at the grid frequency of the electric grid, switch the first set of phases in the multi-phase machine to the electric grid;
       in response to switching the first set of phases in the multi-phase machine to the electric grid, operate a second set of phases in the multi-phase machine through a second inverter, the second set of phases in the multi-phase machine generating energy via electrical coupling to the first set of phases in the multi-phase machine; and provide the energy generated by the second set of phases in the multi-phase machine to charge an energy source of the electric vehicle.

2. The system of claim 1, further comprising a first set of switches and a second set of switches and the controller is further configured to:

operate the first set of phases in the multi-phase machine through the first inverter by closing the first set of switches to connect the first set of phases in the multi-phase machine to the first inverter;

in response to the first set of phases in the multi-phase machine being operated at the grid frequency of the electric grid, open the first set of switches to disconnect the first set of phases in the multi-phase machine from the first inverter; and connect the first set of phases in the multi-phase machine to the electric grid by closing the second set of switches to connect the first set of phases in the multi-phase machine to the electric grid.

3. The system of claim 1, wherein the controller is further configured to:

receive a second request for energy flow from the electric vehicle to the electric grid;

operate the second set of phases in the multi-phase machine through the second inverter, the second set of phases in the multi-phase machine being operated at the grid frequency of the electric grid; and in response to the second set of phases in the multi-phase machine being operated at the grid frequency of the electric grid, switch the first set of phases in the multi-phase machine to the electric grid, the first set of phases in the multi-phase machine generating energy via electrical coupling to the second set of phases in the multi-phase machine, wherein the energy generated by the first set of phases in the multi-phase machine is supplied to the electric grid.

4. The system of claim 3, further comprising a first set of switches and a second set of switches and the controller is further configured to:

connect the first set of phases in the multi-phase machine to the electric grid by opening the first set of switches to disconnect the first set of phases in the multi-phase machine from the first inverter and closing the second set of switches to connect the first set of phases in the multi-phase machine to the electric grid.

5. The system of claim 1, wherein the multi-phase machine is a six-phase machine with each of the first set of phases and the second set of phases being a three-phase system.

6. A controller, comprising:

a processor; and a memory including instructions that, when executed by the processor, cause the controller to:

receive a first request for energy flow from an electric grid to an electric vehicle, the electric vehicle having a multi-phase machine;

operate a first set of phases in the multi-phase machine through a first inverter, the first set of phases in the multi-phase machine being operated at a grid frequency of the electric grid;

in response to the first set of phases in the multi-phase machine being operated at the grid frequency of the electric grid, switch the first set of phases in the multi-phase machine to the electric grid;

in response to switching the first set of phases in the multi-phase machine to the electric grid, operate a second set of phases in the multi-phase machine through a second inverter, the second set of phases in the multi-phase machine generating energy via electrical coupling to the first set of phases in the multi-phase machine; and provide the energy generated by the second set of phases in the multi-phase machine to charge an energy source of the electric vehicle.

7. The controller of claim 6, wherein the instructions, when executed by the processor, further cause the controller to:

in response to the first set of phases in the multi-phase machine being operated at the grid frequency of the electric grid, isolate the first set of phases in the multi-phase machine from the first inverter.

8. The controller of claim 7, wherein the instructions, when executed by the processor, to cause the controller to operate the first set of phases in the multi-phase machine through the first inverter further cause the controller to close a first set of switches to connect the first set of phases in the multi-phase machine to the first inverter.

9. The controller of claim 8, wherein the instructions, when executed by the processor, to cause the controller to isolate the first set of phases in the multi-phase machine from the first inverter further cause the controller to open the first set of switches to disconnect the first set of phases in the multi-phase machine from the first inverter.

10. The controller of claim 9, wherein the instructions, when executed by the processor, to cause the controller to connect the first set of phases in the multi-phase machine to the electric grid further cause the controller to close a second set of switches to connect the first set of phases in the multi-phase machine to the electric grid.

11. The controller of claim 6, wherein the instructions, when executed by the processor, further cause the controller to:

receive a second request for energy flow from the electric vehicle to the electric grid;

operate the second set of phases in the multi-phase machine through the second inverter, the second set of phases in the multi-phase machine being operated at the grid frequency of the electric grid; and in response to the second set of phases in the multi-phase machine being operated at the grid frequency of the electric grid, switch the first set of phases in the multi-phase machine to the electric grid, the first set of phases in the multi-phase machine generating energy via electrical coupling to the second set of phases in the multi-phase machine, wherein the energy generated by the first set of phases in the multi-phase machine is supplied to the electric grid.

12. The controller of claim 11, wherein the instructions, when executed by the processor, to cause the controller to switch the first set of phases in the multi-phase machine to the electric grid further cause the controller to open a first set of switches to disconnect the first set of phases in the multi-phase machine from the first inverter and close a second set of switches to connect the first set of phases in the multi-phase machine to the electric grid.

13. A method, comprising:

determining, by a controller, a direction of energy flow between an electric vehicle and an electric grid, the electric vehicle having a multi-phase machine;

in response to determining that the direction of energy flow is from the electric grid to the electric vehicle, operating, by the controller, a first set of phases in the multi-phase machine through a first inverter, the first set of phases in the multi-phase machine being operated at a grid frequency of the electric grid;

in response to the first set of phases in the multi-phase machine being operated at the grid frequency of the electric grid, switching, by the controller, the first set of phases in the multi-phase machine to the electric grid;

in response to switching the first set of phases in the multi-phase machine to the electric grid, operating, by the controller, a second set of phases in the multi-phase machine through a second inverter, the second set of phases in the multi-phase machine generating energy via electrical coupling to the first set of phases in the multi-phase machine; and providing, by the controller, the energy generated by the second set of phases in the multi-phase machine to charge an energy source of the electric vehicle.

14. The method of claim 13, further comprising:
in response to the first set of phases in the multi-phase machine being operated at the grid frequency of the electric grid, isolating, by the controller, the first set of phases in the multi-phase machine from the first inverter.

15. The method of claim 14, wherein operating the first set of phases in the multi-phase machine through the first inverter includes closing a first set of switches to connect the first set of phases in the multi-phase machine to the first inverter.

16. The method of claim 15, wherein isolating the first set of phases in the multi-phase machine from the first inverter includes opening the first set of switches to disconnect the first set of phases in the multi-phase machine from the first inverter.

17. The method of claim 16, wherein connecting the first set of phases in the multi-phase machine to the electric grid includes closing a second set of switches to connect the first set of phases in the multi-phase machine to the electric grid.

18. The method of claim 13, further comprising:
in response to determining that the direction of energy flow is from the electric vehicle to the electric grid, operating, by the controller, the second set of phases in the multi-phase machine through the second inverter, the second set of phases in the multi-phase machine being operated at the grid frequency of the electric grid; and in response to the second set of phases in the multi-phase machine being operated at the grid frequency of the electric grid, switching, by the controller, the first set of phases in the first multi-phase machine to the electric grid, the first set of phases in the multi-phase machine generating energy via electrical coupling to the second set of phases in the multi-phase machine, wherein the energy generated by the first set of phases in the multi-phase machine is provided to the electric grid.

19. The method of claim 18, wherein switching the first set of phases in the multi-phase machine to the electric grid includes opening a first set of switches to disconnect the first set of phases in the multi-phase machine from the first inverter and closing a second set of switches to connect the first set of phases in the multi-phase machine to the electric grid.

20. The method of claim 13, wherein the multi-phase machine is a six-phase machine with each of the first set of phases and the second set of phases being a three-phase system.

* * * * *